Patented June 3, 1941

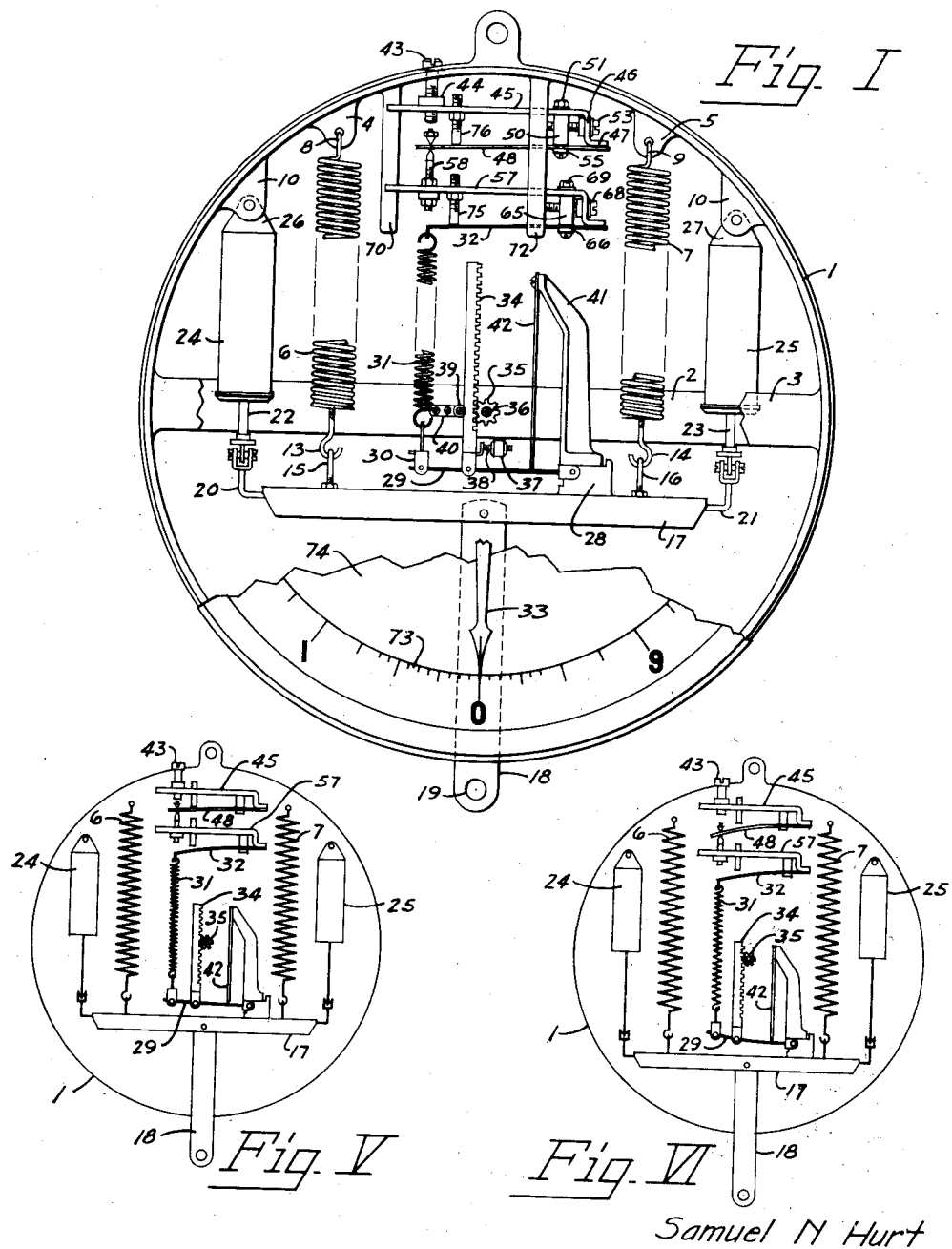

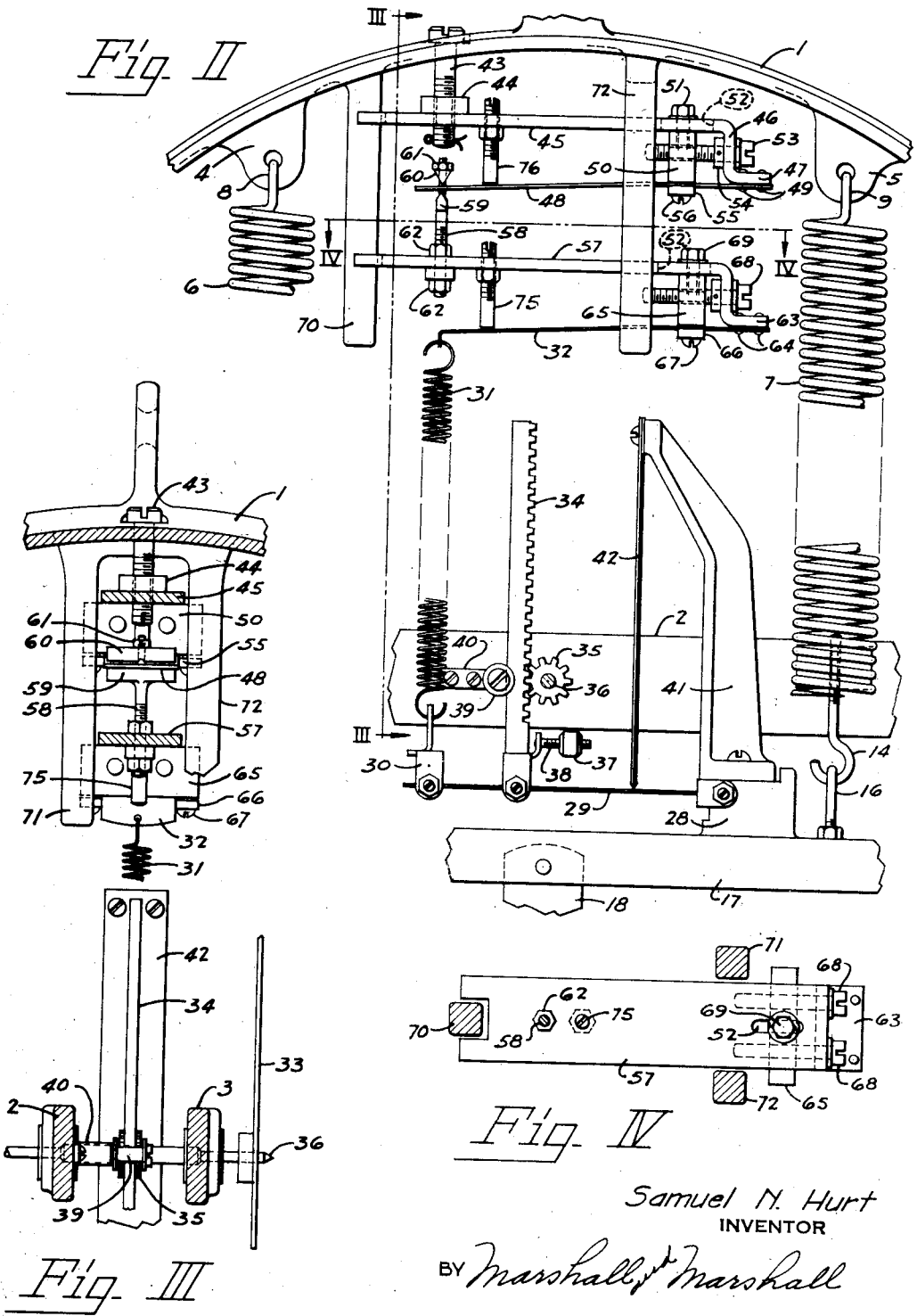

2,244,621

UNITED STATES PATENT OFFICE 2,244,621

WEIGHING SCALE

Samuel N. Hurt, Toledo, Ohio, assignor to Toledo Scale Company, a corporation of New Jersey Application September 22, 1938, Serial No. 231,205

10 Claims. (Cl. 265—68)

This invention relates to weighing scales, and particularly to weighing scales in which the load is counterbalanced by means of springs. It is well known that the action of springs vary with changes in temperature and thermostatic means are usually provided to correct these variations. These counterbalancing springs however also have another inherent mechanical error not compensated for by the action of the thermostatic device. As the springs are stretched the diameter of the coils gradually becomes smaller and as the coils become smaller in diameter their stiffness increases and consequently they do not stretch exactly equal increments for equal loads.

The object of this invention is therefore the provision of improved means for compensating for the latterly mentioned variation in scale springs.

Another object is the provision of a resilient member whose action varies inversely to the variation of the counterbalancing springs under load; and, Still another object is the provision of a plurality of such means which are adapted to be actuated in succession.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevational view of the scale embodying the invention.

Fig. II is an enlarged fragmentary front elevational view showing the invention in greater detail.

Fig. III is an end view of the compensating mechanism sectioned along the line III—III of Fig. II.

Fig. IV is a fragmentary plan view of one of the plurality of compensating means substantially as seen from along the line IV—IV of Fig. II.

Fig. V is a view showing diagrammatically the relative position of the mechanism during a second revolution of the indicator; and, Fig. VI is a similar diagrammatical view showing the relative position of the mechanism during a third revolution.

The invention is illustrated as embodied in a dial scale of the hanging type; however, it should be understood that it is equally applicable to other forms of spring scales having revoluble indicators.

Referring to the drawings in detail, the framework which supports the load counterbalancing mechanism in the form of the device illustrated comprises a hoop-like annulus 1 having a pair of bars 2 and 3 extending diametrically across it at its front and rear edges. Bosses 4 and 5, extending inwardly from the upper portion of the annulus 1, are adapted to support the upper ends of a pair of load counterbalancing helical coil springs 6 and 7, by means of hooks 8 and 9, formed at their upper ends. The lower ends of the springs being connected by means of hooks 13 and 14 adjustably secured at the lower ends of the springs to eyes 15 and 16 which in turn are fastened to a transversely extending channel-shaped equalizer bar 17, a load supporting link 18 being pivotally connected at its upper end to the equalizer bar 17 midway between the eyes 15 and 16. This link 18, which projects through an opening in the lower side of the annulus 1, is provided with an eye 19 to which the bail of a load receiving pan (not shown) may be connected. The equalizer 17 is provided at its ends with upturned ears 20 and 21 to which are pivotally connected the lower ends of plunger rods 22 and 23, their upper ends being connected to plungers (not shown) which reciprocate vertically in inverted air dashpots 24 and 25, their upper ends being provided with lugs 26 and 27 which are secured to bosses 10 extending inwardly from the annulus 1.

Mounted on the web of the channel-shaped equalizer 17 is a block 28 and secured to the block 28 is one end of a laterally extending leaf spring 29, the opposite end of which is pivotally connected to a stirrup 30 hung from the lower end of a light helical spring 31, the upper end of which is connected to an ear of a compensating plate 32. Pivotally supported on the laterally extending leaf spring 29, intermediate the block 28 and the stirrup 30, is the lower end of an upwardly extending rack 34 which meshes with a pinion 35 mounted on a shaft 36 journaled in bearings in the diametrically extending bars 2 and 3 and to which is fixed a pointer or indicating hand 33.

A small weight 37 on a short arm 38 fixed to the rack 34 serves to hold the rack into mesh with the pinion 35 and a guide roller 39 mounted by means of a bracket 40 on the bar 2 serves to prevent the rack from jumping out of mesh with the pinion when the scale is subjected to shock.

Secured to the block 28, and extending upwardly therefrom, is a stand 41 adjacent the top of which is fixed the upper end of bimetallic thermosensitive element 42. The lower end of this element 42, which is preferably provided with a chisel edge, engages the upper surface of the leaf spring 29. The composition and structure of the element is such that when the temperature rises the element 42 bends to move its lower end toward the block 28 along the upper surface of the leaf spring 29 and when the temperature falls the element 42 bends in the opposite direction to move its lower end along the surface of the leaf spring 29 away from the block 28. The effective length of the leaf spring 29, and hence the extent to which it may be bent by a given pull of the light spring 31, is dependent upon the position of the lower end of the thermosensitive element 42.

To accomplish the objects of this invention a bolt 43, projecting freely through an opening near the top of the annular member 1, is threaded into a bushing 44 staked on the upper side of a rigid plate-like bracket 45 having a downwardly bent portion 46 and whose lower end 47 again is bent in a horizontal direction. Since the bolt 43 is free to move in the opening in the annulus 1 through which the bolt 43 projects, the bracket 45, and all the parts supported thereby, are pivotally connected to the annulus. To this horizontally bent end 47 is fastened a flexure plate 48 by means of rivets 49. For its purpose, it is necessary that the fulcrum or the point about which the flexure plate bends be adjustable. To accomplish this, a block 50, whose height is the distance between the underside of the bracket 45 and the bent-over portion 47, is fastened to the bracket 45 by means of a screw 51 which extends through an elongated slot 52 and is threaded into the block 50. A pair of adjusting screws 53, which pass freely through drilled holes in the portion 46 of the bracket 45, are prevented from moving longitudinally by means of collars 54 which are pinned to the body of the screw 53. The bodies of these screws are threaded through holes in the fulcrum block 50. By loosening the screw 51 and turning the screws 53 the position of the block 50 may thus be adjusted in a longitudinal direction. The upper surface of the flexure plate 48 which, in its normal unflexed position, just contacts the bottom of the block 50 is clamped thereto after it is adjusted, by means of a clip 55 and a pair of screws 56 which are spaced so as to straddle the flexure plate 48.

A second bracket 57 is pivotally suspended from the flexure plate 48 by a connection 58 which comprises a threaded body having a T-shaped crosshead 59 whose upper edge is brought to a chisel point. A continuation of the threaded body extends freely through a hole in the flexure plate 48 and through a member 60, shaped similarly to the crosshead 59. A nut 61 is threaded on that portion of the threaded body of the member 58 which projects beyond the member 60 and is adapted to securely clamp the two chisel edges in alignment with each other, one on each side of the flexure plate 48. The lower end of this threaded body of the member 58 projects through a bushing staked to the underside of the bracket 57, and is locked therein by two nuts 62. The shape of the bracket 57 is identical with that of the bracket 45, and to the bent-down horizontal portion 63 the end of the flexure plate 32 is fastened by means of rivets 64. Similarly to the flexure plate 48, the flexure plate 32 is clamped to an adjustable fulcrum block 65 by means of a clip 66 and screws 67. The adjustment of this block along the longitudinal axis of the bracket 57 is had by screws 68 and the block is locked in adjusted position by bolt 69. To prevent the brackets 45 and 57 from rotating about their suspension means, namely the bolt 43 and connection 58, the forward ends of these brackets 45 and 57 are bifurcated (see Fig. IV) and the arms formed by the bifurcation freely straddle a substantially rectangular post 70 which may either be an integral portion of the annular frame 1 or a member studded into a suitable boss. The other end of these brackets 45 and 57 pass between spaced posts 71 and 72. While there is sufficient clearance between the posts 70, 71 and 72 and the adjacent portions of the brackets 45 and 57 so as to be adjusted freely, they serve to limit any sidewise motion.

The indicator 33, as is usual in scales of this kind, cooperates with a series of indicia 73 marked on a chart 74 which is securely fastened to bosses suitably spaced in the interior of the annular frame 1. The operation of the counterbalancing mechanism, the thermostatic correcting device, as well as the indicating means is fully explained in Patent 2,029,926 to Samuel N. Hurt and, therefore, requires no further description herein.

Spring dial scales, as well as dial scales which have a rotary chart are very frequently required to make several revolutions of the indicating means for the full capacity so that the spacings between the graduations are substantially great. Counterbalancing springs may be made so that they may be extended for a considerable distance to obtain the multiple revolution of the indicator but, as previously mentioned, when these helical springs are extended for a considerable amount their stiffness or resistance to load increases as the diameter of the coils of the helix becomes smaller in diameter so that when a scale indicator makes more than one revolution for the full capacity it is often very difficult to properly adjust the scale. In the present invention the two flexure plates 48 and 32, which successively come into play and form a part of the counterbalancing spring mechanism, are provided to compensate for the increased stiffness of the other three counterbalancing springs 6, 7 and 31.

Assuming that the scale has a total load counterbalancing capacity of 30 lbs., the series of indicia 73 on the chart 74 is graduated from zero to 10 lbs., and when a load weighing this amount is placed on the load receiver suspended from the link 18 the indicator will revolve through a complete revolution and stop at the 10 lb. indicium. When additional load is placed on the load receiver the additional pull transmitted through the spring 31 to the flexure plate 32 whose tension is initially adjusted by means of a stud 75 threaded through the bracket 57 now overcomes the initial tension and the end of this flexure plate to which the spring 31 is attached will bow downwardly in proportion to the pull thereon. This downward movement compensates for the increased stiffness of the springs 6, 7 and 31 and the indicator will travel through a second complete revolution when 20 lbs. are on the load receiver. If the tension of the flexure plate 32 be too great, or too small, and subsequently the indicator will not indicate correctly, the effective length of the flexure plate is changed correspondingly by loosening the screw 67, releasing the plate from the fulcrum block 65, by loosening the screws 69 and adjusting the longitudinal position of the block 65 by means of the screws 68. After adjustment the screws 67 and 69 are again locked. When a load in excess of 20 lbs. is placed on the load receiver, the additional pull transmitted through the connecting member 58 is transmitted to the flexure plate 48 which, of course, as can readily be seen, has a greater initial tension but its operation is identical with the flexure plate 32 and its adjustments are made in an identical manner by means of a threaded stud 76 threaded through the bracket 45, the fulcrum block 50 and the screws 51, 56 and 53. The so-called zero adjustment, that is when there is no load on the load receiver, is had by turning the bolt 43 whose head projects on the exterior of the annular frame 1. This shifts the position of the members described until the indicator 33 points to the zero indicium.

It is obvious that the various instrumentalities of which the invention consists can be variously arranged and organized; in fact, it must be understood that the invention is subject to variation, modification and change within the spirit and scope of the subjoined claims.

Having described the invention, I claim:

1. In a device of the class described, in combination, weighing mechanism including a housing therefor, load counterbalancing springs, a plurality of compensating springs cooperating therewith in counterbalancing a load on said weighing mechanism, said compensating springs being adapted to compensate successively for inherent mechanical errors of said load counterbalancing springs, each of said compensating springs having a support, means for pivotally connecting one of said supports to said housing and means for pivotally connecting the other of said supports to one of said compensating springs.

2. In a device of the class described, in combination, weighing mechanism including load counterbalancing springs, a spring cooperating therewith in counterbalancing the weight of a load on said weighing mechanism, said spring also being adapted to compensate for an inherent mechanical error of said load counterbalancing springs, said compensating spring comprising an initially tensioned flexure plate, a support for said flexure plate and means adjustably secured to said support for adjusting the initial tension and flexibility of said plate.

3. In a device of the class described, in combination, weighing mechanism, a housing for said weighing mechanism, said weighing mechanism comprising load receiving means mounted exteriorly of said housing, said load counterbalancing mechanism comprising a plurality of springs, load indicating means actuated by said load counterbalancing mechanism, said load indicating means being adapted to revolve an indicator for more than one revolution, all of said plurality of springs cooperating to counterbalance a load on said load receiving means, one of said plurality springs being adapted to compensate for an inherent non-thermoresponsive mechanical error when said indicator has made one complete revolution and another of said plurality of springs being adapted to compensate for further inherent non-thermoresponsive mechanical error when said indicator has completed the second revolution, both of said compensating springs comprising a plate of resilient metal and being pivotally connected to each other and to said other load counterbalancing springs.

4. In a device of the class described, in combination, weighing mechanism, a housing for said weighing mechanism, said weighing mechanism comprising load receiving means mounted exteriorly of said housing, said load counterbalancing mechanism comprising a plurality of springs, load indicating means actuated by said springs, load indicating means actuated by said load counterbalancing mechanism, said load indicating means being adapted to revolve an indicator for more than one revolution, all of said plurality of springs cooperating to counterbalance a load on said load receiving means, and one of said plurality of springs being adapted to compensate for an inherent non-thermoresponsive mechanical error when said indicator has made one complete revolution, said spring comprising a plate of resilient metal and having another of said plurality of said load counterbalancing springs pivotally connected thereto.

5. In a device of the class described, in combination, helical spring load counterbalancing means which becomes disproportionately stiffer under increasing loads, means for applying loads to said helical spring load counterbalancing means, a flexure plate, means for holding said flexure plate under tension and thereby preventing action thereof in response to loads not exceeding a definite value, and means connecting said helical spring load counterbalancing means to said flexure plate and acting to flex said flexure plate when loads exceeding a definite value are applied to said helical spring load counterbalancing means, said flexure plate acting upon flexion to compensate for the disproportionate stiffness of said helical spring load counterbalancing means.

6. In a device of the class described, in combination, resilient load counterbalancing means which becomes disproportionately stiffer under increasing loads, means for applying loads to said resilient load counterbalancing means, an auxiliary spring, means for holding said auxiliary spring under tension and thereby preventing action thereof in response to loads not exceeding a definite value, means connecting said resilient load counterbalancing means to said auxiliary spring and acting to flex said auxiliary spring when loads exceeding a definite value are applied to said resilient load counterbalancing means, a second auxiliary spring, means for holding said second auxiliary spring under tension and thereby preventing action thereof in response to loads not exceeding a higher definite value than that of loads to which the first said auxiliary spring is responsive, and means acting to flex said second auxiliary spring when loads exceeding such higher definite value are applied to said resilient load counterbalancing means, each of said auxiliary springs acting upon flexion to compensate for the disproportionate stiffness of said resilient load counterbalancing means.

7. In a device of the class described, in combination, helical spring load counterbalancing means which becomes disproportionately stiffer under increasing loads, means for applying loads to said helical spring load counterbalancing means, an auxiliary spring, means for holding said auxiliary spring under tension and thereby preventing action thereof in response to loads not exceeding a definite value, and means connecting said helical spring load counterbalancing means to said auxiliary spring and acting to flex said auxiliary spring when loads exceeding a definite value are applied to said helical spring load counterbalancing means, a second auxiliary spring, means for holding said second auxiliary spring under tension and thereby preventing action thereof in response to loads not exceeding a higher definite value than that to which the first said auxiliary spring is responsive, and means acting to flex said second auxiliary spring when loads exceeding such higher definite value are applied to said helical spring load counterbalancing means, both said auxiliary springs acting upon flexion to compensate for the disproportionate stiffness of said helical load counterbalancing means.

8. In a device of the class described, in combination, helical spring load counterbalancing means which becomes disproportionately stiffer under increasing loads, means for applying loads to said helical spring load counterbalancing means, a flexure plate, means for holding said flexure plate under tension and thereby preventing action thereof in response to loads not exceeding a definite value, and means connecting said helical spring load counterbalancing means to said flexure plate and acting to flex said flexure plate when loads exceeding a definite value are applied to said helical spring load counterbalancing means, a second flexure plate, means for holding said second flexure plate under tension and thereby preventing action thereof in response to loads not exceeding a higher definite value than that to which the first said flexure plate is responsive, and means acting to flex said second flexure plate when loads exceeding such higher definite value are applied to said helical spring load counterbalancing means, both of said flexure plates acting upon flexion to compensate for the disproportionate stiffness of said helical spring load counterbalancing means.

9. In a device of the class described, in combination, resilient load counterbalancing means which becomes disproportionately stiffer under increasing loads, an indicator, flexible means connecting said resilient load counterbalancing means to said indicator, spring means resisting movement of said indicator, and means whereby the flexibility of said spring means is increased upon application to said resilient load counterbalancing means of loads exceeding definite values, the increased flexibility of said spring means compensating for the disproportionate increase in stiffness of said resilient load counterbalancing means, said spring means including a flexure plate.

10. In a device of the class described, in combination, resilient load counterbalancing means which becomes disproportionately stiffer under increasing loads, an indicator, flexible means connecting said resilient load counterbalancing means to said indicator, spring means resisting movement of said indicator, and means whereby the flexibility of said spring means is increased upon application to said resilient load counterbalancing means of loads exceeding definite values, the increased flexibility of said spring means compensating for the disproportionate increase in stiffness of said resilient load counterbalancing means, said spring means including a flexure plate, and the means for increasing the flexibility of said spring means including means for holding said flexure plate under initial tension.

SAMUEL N. HURT.